United States Patent
Coulon et al.

(10) Patent No.: US 6,712,401 B2
(45) Date of Patent: Mar. 30, 2004

(54) TUBULAR THREADED JOINT CAPABLE OF BEING SUBJECTED TO DIAMETRAL EXPANSION

(75) Inventors: Jean-Luc Coulon, Monceau Saint Waast (FR); Thierry Noel, Sebourg (FR); Gabriel Roussie, Mons en Baroeuil (FR); Emmanuel Varenne, Villefranche-sur-Saone (FR)

(73) Assignee: Vallourec Mannesmann Oil & Gas France, Aulnoye-Aymeries (FR)

( * ) Notice: Subject to any disclaimer, the term of this patent is extended or adjusted under 35 U.S.C. 154(b) by 0 days.

(21) Appl. No.: 10/069,501

(22) PCT Filed: Jun. 25, 2001

(86) PCT No.: PCT/FR01/02005

§ 371 (c)(1),
(2), (4) Date: May 22, 2002

(87) PCT Pub. No.: WO02/01102

PCT Pub. Date: Jan. 3, 2002

(65) Prior Publication Data

US 2002/0163192 A1 Nov. 7, 2002

(30) Foreign Application Priority Data

Jun. 30, 2000 (FR) .............................................. 00 08510

(51) Int. Cl.[7] ................................................ F16L 25/00
(52) U.S. Cl. ........................ 285/331; 285/333; 285/390; 285/382; 285/334
(58) Field of Search ............................. 285/333, 334, 285/331, 355, 390, 382

(56) References Cited

U.S. PATENT DOCUMENTS

| | | | |
|---|---|---|---|
| 1,884,551 A | * 10/1932 | Boynton ...................... 277/329 |
| 2,258,066 A | * 10/1941 | Oyen .......................... 285/328 |
| 3,489,437 A | 1/1970 | Duret |
| 3,870,351 A | 3/1975 | Matsuki |
| 4,611,838 A | 9/1986 | Heilmann et al. |
| 4,619,472 A | * 10/1986 | Kozono et al. ............. 285/334 |
| 4,629,221 A | * 12/1986 | Lumsden et al. ........... 285/328 |
| 4,732,416 A | * 3/1988 | Dearden et al. ............ 285/333 |
| 5,078,430 A | * 1/1992 | St. Onge ...................... 285/15 |
| 5,154,452 A | * 10/1992 | Johnson .................... 285/333 |
| 5,462,315 A | * 10/1995 | Klementich ................. 285/24 |
| 5,681,059 A | * 10/1997 | Mackie ....................... 285/94 |
| 5,709,416 A | * 1/1998 | Wood ......................... 285/330 |
| 5,765,836 A | * 6/1998 | Banker et al. .............. 277/603 |
| 5,964,486 A | * 10/1999 | Sinclair ...................... 285/331 |
| 6,047,997 A | 4/2000 | Olivier |
| 6,485,063 B1 | * 11/2002 | Olivier ....................... 285/333 |

FOREIGN PATENT DOCUMENTS

| | | |
|---|---|---|
| JP | 06 346988 | 12/1994 |
| WO | 99 08034 | 2/1999 |
| WO | 01 04520 | 1/2001 |

OTHER PUBLICATIONS

U.S. patent application Ser. No. 10/069,501, Coulon et al., filed May 22, 2002
U.S. patent application Ser. No. 10/470,734, Noel et al., filed Aug. 8, 2003.

* cited by examiner

Primary Examiner—Eric K. Nicholson
(74) Attorney, Agent, or Firm—Oblon, Spivak, McClelland, Maier & Neustadt, P.C.

(57) ABSTRACT

A threaded joint to be expanded, including a lip at the end of the male element end a housing for the lip on the female element to make the threaded joint capable of being sealed and of having a maximum internal passage cross-section after being subjected to diametral expansion by more than 10%. The free male end surface is socketed before expansion into a partially transverse shoulder surface of the female housing through the matching rebating shapes of the surfaces. And, the male lip outer peripheral surface is arranged with little play of the internal peripheral surface of the female housing. Such a threaded joint is particularly useful for casings and tubings used in oil wells.

35 Claims, 3 Drawing Sheets

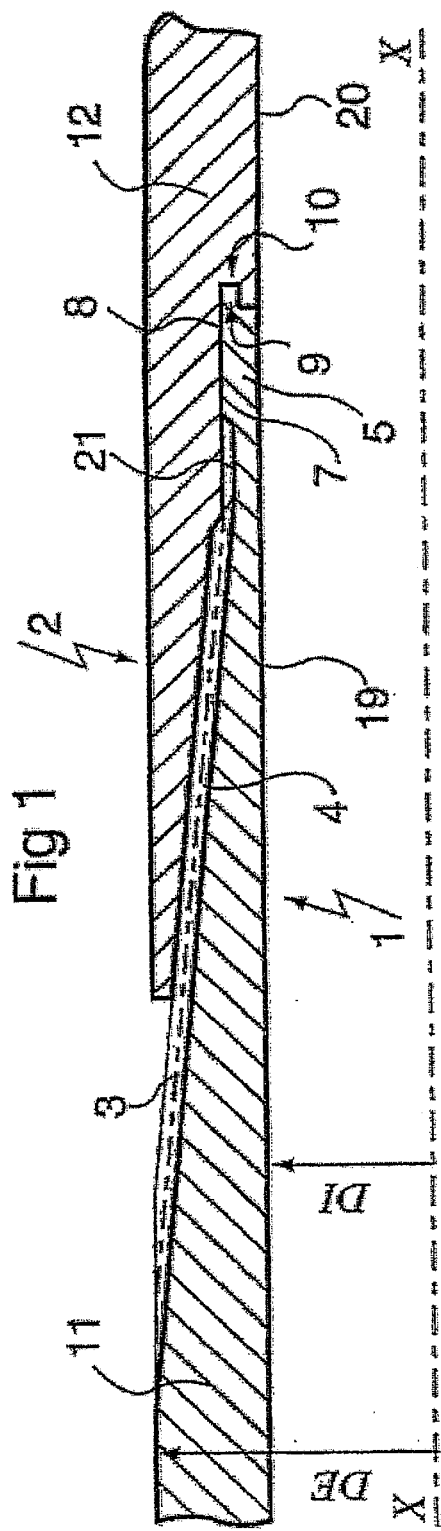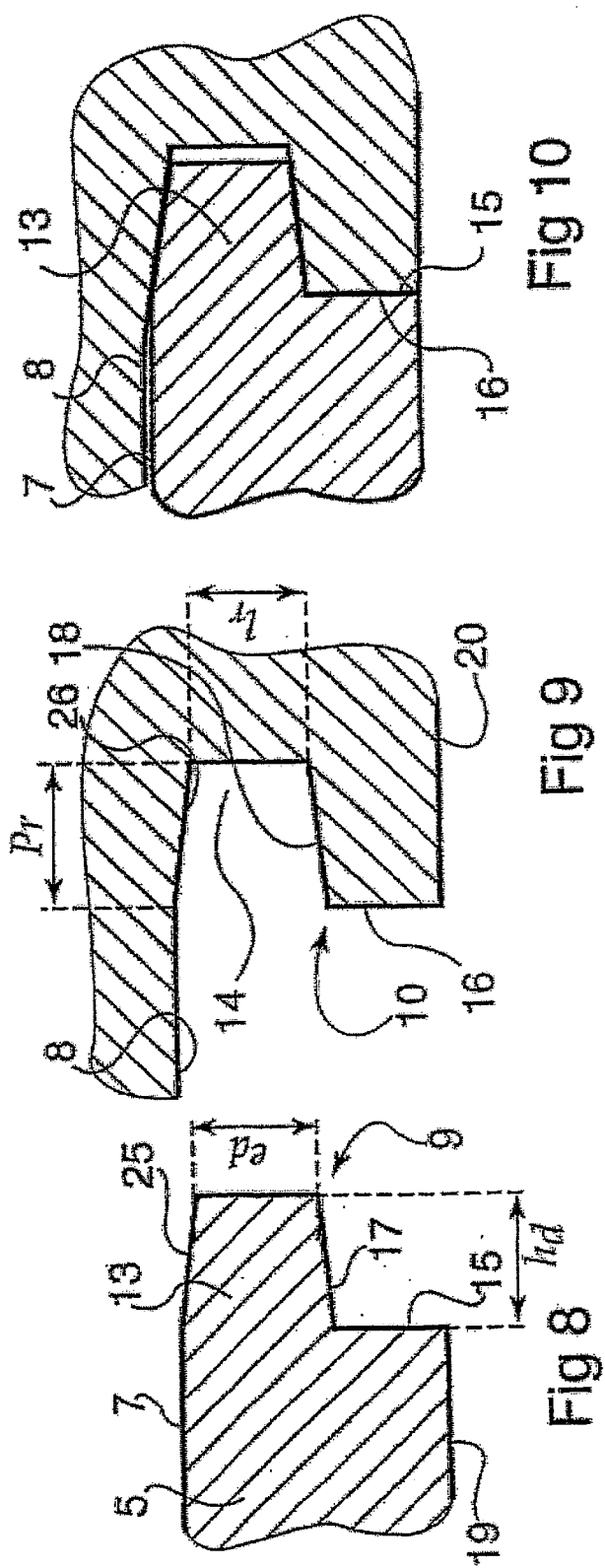

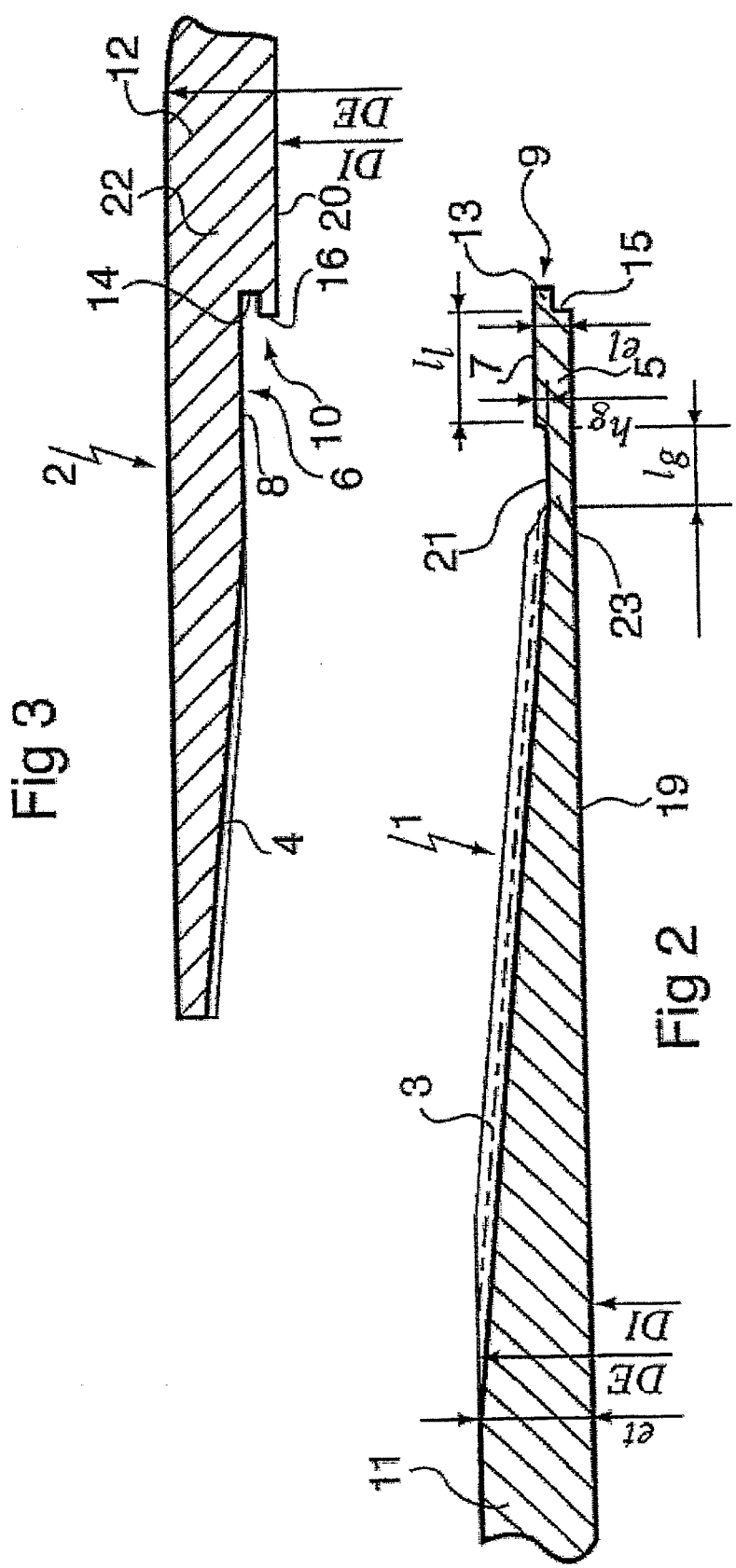

TUBULAR THREADED JOINT CAPABLE OF BEING SUBJECTED TO DIAMETRAL EXPANSION

The invention relates to a threaded tubular connection that can undergo plastic deformation by diametrical expansion and to the connection obtained after such expansion.

Threaded tubular connections are known that are formed between two great-length pipes or between a great-length pipe and a coupling and used in particular to produce casing strings or tubing strings for hydrocarbon wells or the like, such as those for geothermal wells.

Traditionally, wells are drilled with tools of different diameters, the top of the well being drilled using a large diameter tool, of the order of 500 mm, for example, while the well bottom is drilled at a smaller diameter, of the order of 150 mm. The wells are then cased using a plurality of concentric strings all suspended from the surface, pipes with the larger diameter extending from the surface to a depth of a few hundred meters and the smaller diameter pipes extending from the surface to the bottom of the well. The space between the casing pipes and the ground is generally cemented.

When the well is completely drilled and cased, a tubing string is lowered inside the smaller diameter casing string to allow hydrocarbons to rise to the surface.

Thus, fitting a well requires the use of a large number of pipes of different dimensions that are as thin as possible so as not to require too large a casing pipe diameter near the surface.

Taking into account the required mechanical characteristics, casing pipes and production pipes are generally produced from heat treated steel and are connected together by threaded connections, the thickness of the threaded connections being generally larger than that of the regular portion of the pipes and necessitating gaps in the diameters between the concentric strings.

API specification 5 CT from the American Petroleum Institute defines threaded tubular connections between great-length pipes (integral joint tubing, extreme line casing) and threaded and coupled connections comprising two threaded connections for connecting two great-length pipes using a coupling.

A number of patents have improved such connections and threaded connections: For example French patent FR 1 489 013, European patent EP 0 488 912 and U.S. Pat. No. 4,494,777 have aimed to produce threaded tubular connections known as "premium" connections with a particularly good seal thanks to metal—metal sealing surfaces and abutments between the male and female elements.

Very recently, new ways of using tubular strings in hydrocarbon wells have been considered, consisting of expanding the diameter of the pipes in the string by 10% to 20% using a mandrel forced through the inside of the column: see patents or patent applications: WO 93/25799, WO 98/00626, WO 99/06670, WO 99/35368, WO 00/61915, GB 2 344 606 and GB 2 348 657.

Such expansion can, for example, allow a casing string to be placed without having to cement the space between the external peripheral surface of the pipes and the surface of the hole drilled in the ground or lowering a string with a low bulk with respect to the hole.

Such expansion can also enable to plug holes in a casing or tubing pipe perforated by corrosion or by friction of the drilling strings, or to lower pipes with a low bulk which will be expanded to the desired diameter once in position.

However, the expansion technique can above all allow wells to be drilled that have a uniform diameter over their entire length and casing can be carried out using a string with a constant diameter, the pipes being introduced in the unexpanded state then expanded in situ to the diameter of the well.

It is then possible to substantially reduce the number of pipes required to fit a well by doing away with the largest diameter and thickest pipes, and thus reducing the cost of the well. It can even be thought of drilling a well directly with the casing string, which would then act as the drilling string.

However, prior art threaded tubular connections such as those described in U.S. Pat No. 4,494,777 do not allow such uses.

With such connections, after expansion:

an absence of a seal is observed which in particular prevents expansion from being carried out by hydraulically forcing the mandrel along the column;

sprue is observed from the male end towards the interior of the connection, which considerably and unacceptably reduces the operational internal diameter of the string by producing an internal projection into the space defined by the operational internal diameter;

possibly, the lip may be observed to break by exceeding the deformation capacity of certain particularly highly stressed zones due to variations in thickness along the male and female elements with respect to the thickness of the pipe body.

For this reason, the documents cited above dealing with expansion techniques only describe welded connections (coils of pipes previously butt-welded, deployed from the surface) or friction connections ("slips") as embodiments of the connections between the pipes, while threaded connections are known for their performance combining mechanical strength, a seal under all service conditions and the possibility of making a series of consecutive makeup-breakout trips.

It should be noted that U.S. Pat. No. 5,924,745 and WO 98/42947 describe threaded connections for connecting pipes known as "EST" pipes (expansible slotted tubing) provided with longitudinal slots allowing the pipes at the bottom of the hydrocarbon production wells to be expanded diametrically by passing an expansion mandrel through those pipes. Such threaded connections are not aimed at providing a seal, given that the pipes are provided with slots traversing the wall of the pipes and allowing a fluid that is outside the pipe (hydrocarbon from the field) to enter the pipe and rise to the surface therein.

We have thus sought to develop a threaded tubular connection that can resist the expansion operation in the well and which is tight to liquids and if possible to gases after said expansion operation.

We have also sought a simple, cheaply produced threaded tubular connection.

We have also sought a threaded connection with good metallurgical characteristics under operational conditions and thus, after expansion, with a sufficient yield strength in that condition, and free of brittleness and with good sulphide stress cracking characteristics.

In accordance with the present invention, the threaded tubular connection for expansion comprises a male threaded element with an external male threading at the end of a first pipe and a female threaded element with an internal female threading at the end of a second pipe.

Beyond the male threading and moving towards the free end of the element, the male threaded element comprises a male, non threaded lip with an external peripheral surface and terminates in a male end surface that is annular in shape and with a partially transverse orientation.

The female threaded element comprises a female threading that mates with the male threading and a non-threaded female housing for the male lip. This housing comprises an internal peripheral surface and a female shoulder surface that is annular in shape and with a partially transverse orientation connected to the internal peripheral surface of the second pipe.

The male threading is made up into the female threading to a position in which the surface of the male end is engaged against the surface of the female shoulder.

In accordance with a general characteristic of the invention rendering the threaded tubular connection capable of being sealed and of having a maximum internal cross section for passage after having undergone diametrical expansion in the plastic deformation region, the male end and female shoulder surfaces have complementary shapes producing, before expansion, embedding of the male end surface in that of the female shoulder.

Further, the external peripheral surface of the male lip is disposed with a small clearance from the internal peripheral surface of the female housing.

Embedding of the male end surface in that of the female shoulder means a bending moment on the free end of the male lip when the full thickness zone of the second pipe located beyond the female end is inclined with respect to the axis of the connection during expansion.

The embedding enables to constitute on the threaded connection, in the diametrically expanded condition, an annular sealing zone by metal/metal contact pressure between a portion of the external peripheral surface of the male lip and a corresponding portion of the internal peripheral surface of the female housing.

The embedding can also prevent any natural tendency of said free end to dip towards the interior of the string during expansion and produce an internal projection in the absence of such an embedding.

This behaviour during expansion, as established by the inventors in an unexpected manner, will be explained in the detailed portion of the description.

The term "small clearance between the external peripheral surface of the male lip and the internal peripheral surface of the female housing" means clearances measured perpendicular to these surfaces of 0.3 mm or less.

The absence of substantial radial interference between the external peripheral surface of the male lip and the internal surface of the female housing due to this clearance means that these peripheral surfaces do not act as sealing surfaces in the non expanded connection. The inventors have established that a radial interference of these surfaces before expanding the threaded connection is not necessary for the production of a sealed connection after expansion.

They have also established that too much space between these surfaces does not allow them to interference fit after expansion, which interference fit is necessary to obtain a sealed threaded connection.

Prior art document U.S. Pat. No. 4,611,838 describes a threaded connection with a male lip in correspondence with a female housing and with an annular surface of the male end comprising an annular tooth and an annular surface of the female shoulder comprising an annular groove, abutting against each other, the male lip having a toroidal external peripheral end surface and the female housing having a tapered internal peripheral surface.

Those peripheral surfaces radially interfere at the end of makeup to constitute sealing surfaces; U.S. Pat. No. 4,611,838 aims to maximise the radial interference of the external toroidal peripheral surface of the male lip with the internal tapered peripheral surface of the female housing at the end of makeup (and thus provide the seal for the threaded connection) thanks to the shape of those peripheral surfaces and the supporting effect of the lower surface of the groove for the lower surface of the tooth.

However, the male end surface in that patent is not completely embedded in that of the female shoulder of the threaded connection and thus cannot transmit a bending moment to the free end of the male lip because of the free space between the upper wall of the tongue at the free end thereof and the upper wall of the groove at the base thereof.

There is no suggestion in that document regarding the effects on the sealing surfaces of diametrical expansion with plastic deformation, nor that the threaded connection could successfully undergo such expansion. In the inventors' experience, the seal of a threaded connection in accordance with U.S. Pat. No. 4,611,838 could not be ensured after such an expansion.

U.S. Pat. No. 3,870,351 describes a configuration of the male lip and male end and female housing close to the configuration of U.S. Pat. No. 4,611,838, the surface of the free male end being convexly bowed and bearing against a concavely bowed female shoulder surface to produce two sets of metal—metal sealing surfaces, one at the level of the bowed surfaces, the other at the external peripheral surface of the male lip and on the internal peripheral surface of the female housing. Such a configuration can increase the radial interference between the peripheral sealing surfaces.

International patent application WO 99/08034 describes a threaded connection with square threads with a male lip corresponding with a female housing and with annular male end surfaces and female shoulder surfaces in the form of rabbets that come into abutment and embed into each other. The external peripheral surface of the male lip and the internal peripheral surface of the female housing have cylindrical portions that radially interfere with each other to form a set of peripheral sealing surfaces at the end of makeup when the male and female rabbets are embedded.

Finally, U.S. Pat. No. 6,047,997 describes a drilling string structure for underground ducts for which there is no particular demand for a seal. The male end surface in that patent is embedded in a female shoulder surface but the figures show a large space between the external peripheral surface of the male lip and the internal peripheral surface of the female housing.

None of these four cited documents describes a structure that is identical to that claimed in the present invention. Further, none of them considers diametrical expansion of threaded connections and nor do they describe the possibility of producing sealed threaded connections after such expansion.

Preferably, in accordance with the present invention, to enable it to be embedded in the female shoulder, the male end surface has the form of a rabbet constituted by a transverse surface on the side directed towards the interior of the threaded connection and an axially projecting annular tongue on the opposite side. In order to co-operate with the male end surface, the female shoulder surface has the form of a rabbet constituted by a transverse surface on the side directed towards the interior of the threaded connection and an annular groove on the opposite side, the transverse surface of the male rabbet co-operating with that of the female rabbet and the annular tongue co-operating with the annular groove.

Highly preferably in the present invention, the annular walls of the groove interference fit with those of the tongue.

Advantageously, in the made up position, the transverse surfaces of the rabbet on the internal side thereof abut each other. Alternatively, they can be simply in quasi-contact.

Preferably again, the radial thickness of the tongue on the male rabbet is substantially equal to that of the transverse surface of the same rabbet.

Preferably again, the axial height of the tongue of the male rabbet is substantially equal to its radial thickness.

Preferably again, the external peripheral surface of the male lip and the internal peripheral surface of the female housing are cylindrical surfaces: machining these non-interfering surfaces is thus particularly simple and cheap.

Advantageously, the thickness of the male lip is in the range ⅓ to ⅔ of the thickness of the first pipe.

This range of thickness of the male lip ensures a critical cross section at the base of the threading that is sufficient to provide adequate strength on axial tension of the threaded connection.

Advantageously again, the ratio between the length and thickness of the male lip is in the range 1 to 4, the length of the male lip being measured from the transverse surface of the male rabbet.

The minimum value of this ratio allows plastic deformation of the male lip and of the female housing during expansion; these plastic deformations generate surfaces bearing against each other with a high contact pressure and thus provides the seal for the threaded connection after expansion.

The maximum value of this ratio enables to avoid uncontrolled buckling of the male lip, which buckling would result in said lip projecting inside the pipe string.

Highly advantageously, the male threaded element has a groove at the end of the threading between the threading and the male lip. This groove facilitates plastic deformation of the male lip during expansion of the threaded connection.

Preferably, the depth of the groove is substantially equal to the height of the male thread such that the base of the male threads opens into the base of the groove.

Preferably again, the length of the groove is in the range 2 to 8 times its depth. A length/depth ratio of less than 2 will not allow the groove to facilitate plastic deformation of the lip. A length/depth ratio of more than 8 will result in a high risk of buckling of the material towards the interior of the column during expansion.

The invention can advantageously be applied both to threaded connections with tapered threadings and to threaded connections with straight threadings with single and/or multiple stages.

Advantageously again, the first pipe and the second pipe have the same internal diameter both at the level of the threaded elements and at the level of the pipe body, facilitating expansion operations.

Advantageously again, this is the same for the external diameters.

Highly advantageously, the threaded connection is integral in nature, i.e., each pipe is a great-length pipe which comprises a male threaded element at one end and a female threaded element at the other end, the male element of one pipe being made up into the female element of another pipe and so on to constitute a string.

The aim of the present invention is to protect a sealed threaded connection resulting from diametrical expansion in the plastic deformation region of a threaded connection as defined above.

Preferably, the diametrical expansion that is carried out is more than 10%.

The present invention also aims to protect the threaded connections described above in the non expanded or expanded condition wherein the threaded elements are produced from steel comprising nitrogen fixing elements rendering the steel insensitive to ageing by work hardening. The steel is also heat treated to maximise its uniform elongation properties. This results in good properties in service.

The present invention also aims to protect a process for producing a sealed threaded tubular connection.

In accordance with this process, starting from a threaded tubular connection of the invention as described above, termed the "initial threaded tubular connection" for which no sealing properties are required, this initial threaded connection undergoes diametrical expansion in the plastic deformation region using an expansion mandrel with a diameter that is higher than the internal diameter of the pipes of the initial threaded connection, the expansion mandrel being axially displaced in the initial threaded connection. The dimensions of the male lip and the female housing are such that during passage of the mandrel, the male lip and the female housing together first undergo plastic bending deformation while only the female housing then undergoes plastic deformation in the reverse, straightening, direction, which finally interference fits the male lip with the female housing.

Preferably, bending of the male lip is delimited by the presence of a groove at the end of the male lip on the male threading side.

Preferably again, the threaded tubular connection employed is integral in nature and the expansion mandrel is displaced from the male threaded element towards the female threaded element.

The accompanying figures provide in a non-limiting way embodiments of the invention.

FIG. 1 shows a threaded connection of the invention before diametrical expansion.

FIG. 2 shows the male element of the threaded connection of FIG. 1.

FIG. 3 shows the female element of the threaded connection of FIG. 1.

FIG. 4 shows the expansion phase of the threaded connection.

FIG. 5 shows the bending phase.

FIG. 6 shows the straightening phase.

FIG. 7 shows the final state of the threaded connection that has undergone the expansion process.

FIG. 8 shows a detail of FIG. 2 at the male free end.

FIG. 9 shows a detail of FIG. 3 at the female housing.

FIG. 10 shows a detail of FIG. 1.

Figure 4:
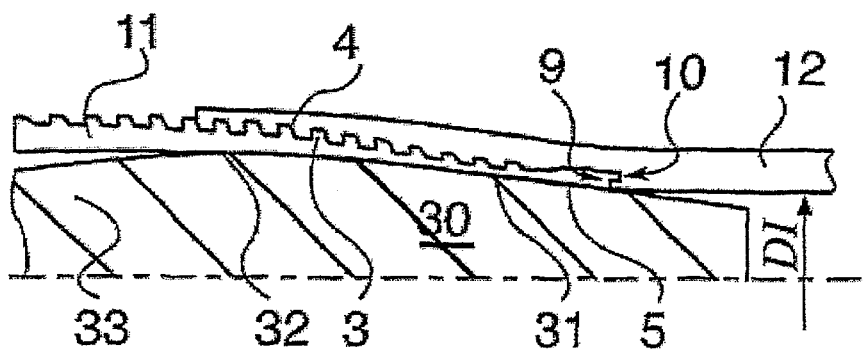
FIGS. 4 to 7 show the threaded connection of the invention at various stages in the expansion process.

FIG. 1 shows a threaded connection of the invention, comprising a male threaded element 1 disposed at the end of a first pipe 11, the male element being made up into and abutted with a female threaded element 2 disposed at the end of a second pipe 12. The internal diameter of the male threaded element is equal to the internal diameter DI of pipes 11, 12. In addition, the external diameter of the female threaded element is in the present case equal to the external diameter DE of pipes 11, 12, but it may be different.

The threaded connection is shown in FIG. 1 in the simple made up state in abutment before any diametrical expansion operation.

The second pipe 12 as shown is a great-length pipe but may be a coupling (not shown) provided with a female element 2 and a symmetrically disposed second female element made up into a male element located at the end of an other great-length pipe.

The male element 1 is shown alone in FIG. 2.

It comprises a male threading 3, which is tapered with trapezoidal threads, and is extended towards its free end by a non threaded portion constituted by a groove 21 and by a lip 5 and terminates in a male annular end surface 9.

Groove 21 is in the form of a shallow U.

It begins immediately beyond the threading and its depth hg is equal to the height of the threads of threading 3. Thus, the base of the groove arrives at the foot of the first thread of the threading.

The width lg of the groove is substantially equal to 4 times its depth hg.

Lip 5 has the following:
a) an external peripheral surface 7, cylindrical in form;
b) an internal peripheral surface 19, which corresponds to the end zone of the cylindrical internal peripheral surface of the first pipe 11.

Lip 5 thus has a uniform thickness $e_l$ that is substantially equal to half the thickness et of pipe 11. Its length $l_l$ measured from the end of the groove to the surface 15 (defined below) is substantially equal to 3 times the thickness $e_l$ of the lip.

The male end surface 9 forms a rabbet shown in detail in FIG. 8. This rabbet is constituted by a male annular transverse surface 15 and an annular tongue 13 that projects axially. The male transverse surface 15 is located on the side of the rabbet directed towards the interior of the threaded connection.

Walls 17, 25 of tongue 13 are not rigorously parallel but converge slightly towards the free end of the tongue; these walls are thus carried by slightly tapered surfaces that are coaxial with the axis of the assembly and with a vertex half-angle of 1 to 2 degrees.

The radial thickness (ed) of tongue 13 is substantially identical to that of the transverse surface 15, while the length of the tongue (hd) (or axial projection thereof) is substantially equal to the radial thickness (ed) of that tongue.

Female element 2 is shown alone in FIG. 3.

It comprises a female threading 4 with trapezoidal threads that mate with male threading 3 and a non threaded portion 6 located on the side opposite the free end of the female element with respect to the female threading 4. This non-threaded portion 6 forms a housing to correspond and co-operate with lip 5 on male element 1.

Female housing 6 has an internal peripheral housing surface 8 that is cylindrical in shape connected on one side to the female threading 4 and on the other side via a female shoulder 10 to the cylindrical internal peripheral surface 20 of the second pipe 12.

The diameter of the peripheral surface of housing 8 is very slightly larger than the diameter of the external peripheral surface 7 of the male lip 5 such that surfaces 7 and 8 can slide against each other with a small clearance during makeup of the male element into the female element, for example with a clearance of 0.2 mm.

The female shoulder (see FIG. 9) has an annular shoulder surface 10 that is disposed in a substantially corresponding manner and has a shape that substantially corresponds with that of male end 9. Surface 10 forms a rabbet constituted by a female transverse surface 16 and an annular groove 14.

The female transverse surface 16 is located on the side of the rabbet directed towards the interior of the threaded connection.

Groove 14 has an axial depth (Pr) that is slightly greater than the height of the tongue 13 such that, in the connected position, the male and female annular transverse surfaces 15, 16 abut against each other while the end of tongue 13 does not bear against the base of the groove 14 (see FIG. 10).

Walls 18, 26 of groove 14 are not rigorously parallel but converge slightly towards the bottom of the groove; these walls are thus carried by slightly tapered surfaces coaxial with the axis of the connection and the vertex half-angle of which is 1 to 2 degrees, as is the vertex half angle of walls 17, 25 of tongue 13.

The radial width (lr) of the groove is thus not rigorously constant over the whole of the length of the groove; it is adapted so that the peripheral walls of tongue 13 come into contact with the corresponding walls of the groove 14 slightly in advance of the made up position.

This enables to provide both the small clearance required between the cylindrical peripheral surfaces of lip 7 and housing 8 and the interference fit of tongue 13 by groove 14. This interference fit and abutment of the transverse surfaces 15, 16 constitute a preferred mode for ensuring embedding of the male end surface 9 with that of the female shoulder 10.

FIGS. 4 to 7 explain the deformation phenomena occurring when diametrical expansion by an amount of the order of 15% is carried out using a mandrel on pipes connected by the threaded connections which have been described and which can finally produce a sealed expanded connection.

Such a deformation carried out on metallic materials leads to plastic deformation of the metal.

Thus, for example, the pre-expansion external diameter of 139.7 mm (5½") for the second pipe 12 upstream of expansion and as a result on the not yet deformed portion changes to an external diameter of 157.5 mm (6.2") for the expanded first pipe 11 (at the level of the exit cone or downstream of the exit cone 33 of the mandrel). For this reason, the metal used for the pipes must accept plastic deformations.

The plastic deformations generated increase the yield strength of the products: after deformation, the yield strength of a pipe with an initial yield strength of 310 MPa (45 KSI) will increase to 380 MPa (55 KSI).

The diametrical expansion is carried out in known manner using a mandrel 30 (FIG. 4) with a suitable maximum diameter the passage of which through the pipes is forced either by pulling it using the drilling strings or by pushing it, for example under hydraulic pressure.

The mandrel has, for example, a biconical form with an entry cone 31 on which expansion is carried out, a medial cylindrical portion 32 and a tapered exit portion 33. All the surfaces of the portions of the mandrel are connected together by suitable radii of curvature.

International patent application WO 93/25800 discloses angles for entry cones that are particularly suitable for diametrical expansion of EST pipes for exploiting hydrocarbon wells.

Pipes 11, 12 with a constant cross section at their ends do not present any particular problem during passage of the mandrel provided that the deformation capacity of the metal from which they are formed is sufficient.

Problems to be overcome arise from the fact that the threaded elements at the ends of the pipes are thinner than in the pipe body and the male portions and the corresponding female portions tend to deform in a different manner.

If controlled using a threaded connection of the invention, these different deformations enable to produce a threaded connection that is sealed after diametrical expansion with no deleterious local profiles on the internal peripheral surface of the pipes.

The expansion process for the threaded connection can be divided into 4 phases, as shown in FIGS. 4 to 7.

While the expansion operation can be carried out in the opposite direction and produce satisfactory results, the preferred mode of deformation has been shown in which the mandrel is displaced from male element 1 in first pipe 11 to female element 2 of the second pipe 12.

a) Expansion Phase on Mandrel Cone

FIG. 4 shows the threaded connection during this phase.

Expansion is carried out by the entry cone 31 of mandrel 30 and FIG. 4 shows the male 3 and female 4 threadings during diametrical expansion.

In FIG. 4, the entry cone 31 of mandrel 30 initiates deformation of the male lip and the corresponding female housing zone by bending them to incline them with respect to the axis of the connection.

During this expansion phase, reactive loads on the passage of the mandrel 30 are gradually transferred from the first pipe 11 to the second pipe 12.

Because of these reactive loads, the male lip 5 is axially compressed during this expansion phase by the annular surface of the female shoulder 10.

The end of the expansion phase corresponds to the arrival of the free end of the male element at the end of the entry cone 31 of the mandrel.

b) Bending Phase

Figure 5:
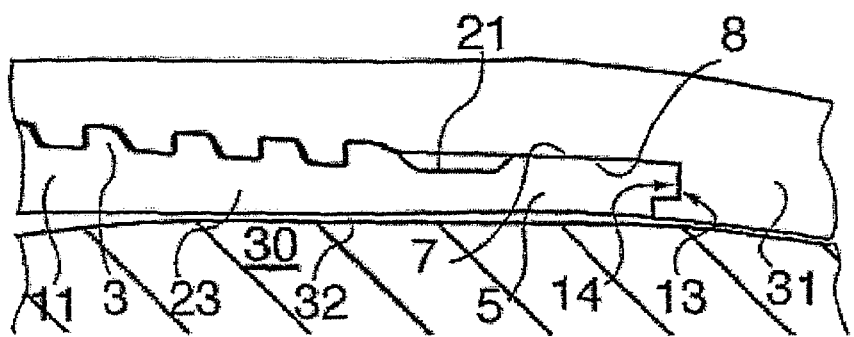

During this phase, the male lip is located at the level of the central portion 32 of the mandrel: see FIG. 5.

i) Male Lip

Each end of the male lip 5 is subjected to bending moments, in opposing directions.

The male end surface 9 is embedded in the female shoulder surface 10 because of the bearing rabbets 15, 16 and the tongue 13/groove 14 interference fitting system.

The embedding of the rabbets obliges the free end zone of the male lip 5 to follow the inclination of full thickness zone 22 of the female element beyond the shoulder, which zone 22 is still undergoing expansion over the entry cone 31 of the mandrel, and thus a bending moment is produced at this position.

The other end of the lip, on the male threading 3 side, is no longer supported and, in contrast, imposes a bending moment on the lip that is in the opposite sense with respect to that on the free end of the lip.

The bending moments with opposite signs at the two ends of the male lip cause male lip 5 as shown in FIG. 5 to bend into a banana shape, and the external peripheral surface 7 of lip 5 takes on a convex bowed shape.

The axial compression in male lip 5 at the end of the expansion phase facilitates its curvature under the effect of the bending motions.

Groove 21 located between the male lip 5 and the male threading 3 acts as a plastic pivot which accentuates the curvature of the male lip by limiting the width over which this curvature can be effected.

However, care must be taken here that the axial compressive stresses at the male lip do not induce buckling of the metal 23 under the groove, which would result in projection of the metal beneath the groove with respect to the internal peripheral surface 19.

ii) Female Housing

The same bending phenomenon occurs in the female housing.

During passage of the medial portion, full thickness zone 22, which is relatively rigid compared with the relatively thin zones of the lip, undergoes an additional expansion such that the internal diameter of zone 22 becomes greater than that of medial zone 32 of the mandrel. The additional expansion phenomenon has been described in WO 93/25800.

c) Straightening Phase

Figure 6:
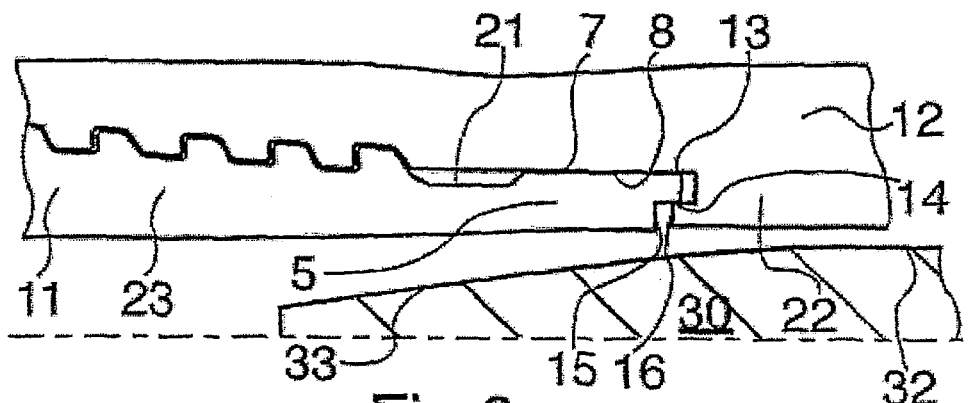

This phase is illustrated in FIG. 6 and corresponds to passage of full thickness female zone 22 over the medial portion 32 of mandrel 30.

i) Female Housing

The bending generated in the preceding phase tends to be reduced to zero under the effect of tension and circumferential stresses, which generates axial bending stresses that are reversed with respect to the curvature, producing straightening.

The bending moment engendered by these stresses is proportional to the thickness of the material upstream of the straightened part. At the moment of arrival at full thickness pipe 12 (zone 22), the bending moment is not sufficient to straighten the internal peripheral zone of the female housing which then tends to dip towards the axis of the product. This behaviour manifests itself as a local reduction in the external diameter of pipe 12.

ii) Male Lip

Figure 7:
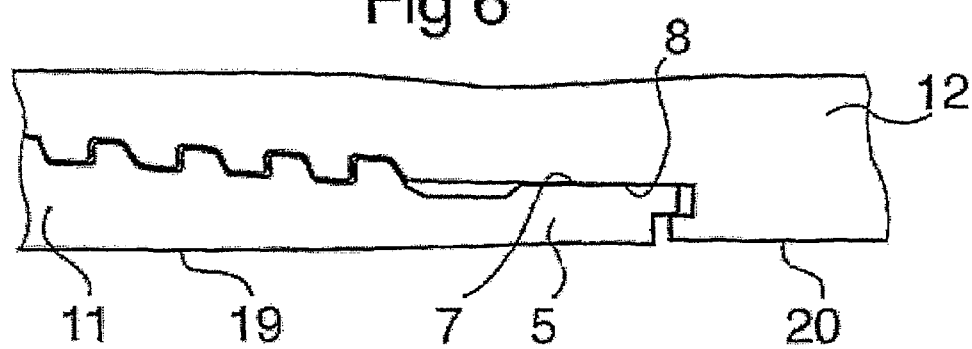

As the female portion straightens, the difference in axial bulk generated by the bending reduces. The male lip 5 thus gradually loses is compressive state. This is followed by separation of the surfaces 15, 16 that were initially abutting. This phenomenon is reinforced by the "dip" in the internal peripheral surface 8 of the female housing which produces the effect of opening the abutments 15, 16. The banana deformation imposed in the preceding phase is preserved.

d) Final State FIG. 7 shows the final state of the threaded connection after passage of the mandrel.

The circumferential stresses generated by the expansion leads to an interference fit of the external peripheral surface 7 of the male lip by the internal surface 8 of the female housing. Surfaces 7, 8 can be stated to have exhibited an auto-interference fit in the expanded state, ensuring a seal. The male lip 5 does not dip towards the axis, as the behaviour imposed by the embedding of the rabbets 9, 10 has generated sufficient plastic deformations.

The spring back of the elements of the threaded connection after passage of the mandrel is negligible in the light of the plastic deformations involved.

The radial interference fit induces a contact pressure of several tens of MPa, sufficient to ensure a seal at the internal or external pressures applied to the threaded connection.

A seal is also necessary when expansion is carried out by hydraulically pushing mandrel 30 under a pressure of 10 to 30 MPa; any leak at the level of already expanded connections will prevent penetration of the mandrel further along the string and thus prevent the expansion process.

It should be noted that in the final state, it may occur that tongue 13 is no longer in groove 14 and in particular no longer on the internal wall 18 of the groove.

The features claimed in claim 1 and its dependent claims can achieve the desired results.

A male end surface 9 not allowing embedding with that of the female shoulder 10 causes this end to dip during the straightening phase which then involves separation of the transverse surfaces 15 and 16 that initially abut and results in an unacceptable projection of the lower end of the male lip into the interior of the string. The string can no longer allow apparatus or tools of a given bulk to be lowered.

Too much clearance between the peripheral surface 7 of male lip 5 and the peripheral surface 8 of the female housing on the threaded connection before expansion would not provide an interference fit of these surfaces at the end of the expansion operation.

A radial interference between these surfaces in the initial state before expansion is susceptible of deleteriously affecting differential deformations (curvature, straightening) between these surfaces during the expansion operation, which differential deformations produce the interference fit of these surfaces at the end of the expansion operation.

The preferred shape for the annular rabbet with transverse surfaces 15, 16 and tongue 13/groove 14 system can prevent dipping of the male free end during expansion, but this is only an example of a possible embodiment for the embedded surfaces 9, 10; other embodiments that produce the same result are possible.

Too thin a male lip 5 with a thickness $e_l$ less than a third of the thickness $e_t$ of pipes 11, 12 will not result in effective abutment between the transverse surfaces 15, 16.

In contrast, if the thickness $e_l$ of the male lip 5 is more than ⅔ of the thickness $e_t$ of pipes 11, 12, the thickness of pipe 12 at the female housing zone involves too small a critical cross section of the female threading 4 and as a result, insufficient resistance of the threadings to tension.

The length/thickness ratio of the male lip 5 governs the compression and bending behaviour of the lip 5.

A male lip 5 with a length $l_l$ that is shorter than its thickness $e_t$ will not allow sufficient bending of the peripheral surface 7 of the male lip 5 and/or straightening of the peripheral surface 8 of the female housing.

A male lip 5 with a length $l_l$ more than 4 times its thickness $e_l$ will cause buckling of the male lip and a projection inside it on the threading side.

This effect is accentuated by the presence of a groove 21 between the male threading 3 and the male lip 5.

For this reason, the groove depth is preferably limited to the thread height and the length is limited with respect to its depth.

EXAMPLE

Pipes with An External Diameter ED of 139.7 mm and Nominal Thickness $e_t$ of 7.72 mm (5½"×17.00 lb/ft) of Carbon Steel Treated to a Minimum Yield Strength of 290 MPa (42 KSI)

The chemical composition of the steel and its heat treatment are adapted to produce the highest possible ductility properties and more particularly high uniform elongation properties before reduction of area AR during the tensile test (AR 15% or more, for example).

As an example, we select a steel with a sufficiently low carbon content, close to 0.14% (by weight), with a relatively high manganese content, of the order of 1% and with added aluminium to fix residual nitrogen in the steel.

An Al content of 0.035% for a nitrogen content of 0.010% is particularly suitable provided that the steel is heat treated by annealing or quenching followed by tempering so that adding Al is effective at fixing nitrogen. Other known chemical elements for fixing nitrogen can also be used together with or in place of the aluminium.

Such a chemical composition that aims to eliminate traces of interstitial free atoms such as nitrogen also renders the steel insensitive to the deleterious phenomenon of ageing after work hardening, which also deteriorates ductility.

The steel can be, in the annealed state (normalisation or stress relief annealing after cold working, for example) or in a structurally equivalent condition.

Integral Threaded Connections of the Invention
tapered threadings 3,4 (taper=12.5% over diameter) with trapezoidal threads with a radial height of 1 mm and an axial pitch of 4 mm;

male lip 5, cylindrical;
male lip thickness $e_l$ 3.2 mm (41% of pipe thickness);
male lip length $l_l$=11.5 mm;
groove 21, depth hg 1 mm and length lg 4 mm between end of male threading 3 and male lip 5;
male end surface 9 with a tongue 13 with an axial length of 1.8 mm and radial thickness of 1.8 mm;
tension strength of threaded connection≧50% of the tensile strength of each of the pipe bodies 11, 12.

Results After Expansion of Pipe String
external diameter of pipes 11, 12—157.5 mm (6.2");
pipe thickness: 7.2 mm;
pipe yield strength≧415 MPa (60 KSI);
hardness≦22 HRc (maximum value, NACE specification MR 01 75);
passed the following tests carried out in the expanded state and the expanded+aged state:
→internal pressure rupture test;
→collapse under external pressure test;
→Charpy V shock test;
→SSC (sulfide stress cracking) test in accordance with NACE specification TM 01-77 (NB: NACE= National Association of Corrosion Engineers, USA).

The description of the disclosed embodiments does not limit the protection of the present invention to those embodiments, and embodiments not disclosed in detail are encompassed within the scope of the invention.

What is claimed is:

1. A threaded tubular connection comprising:
a male threaded element at one end of a first pipe; and
a female threaded element at one end of a second pipe;
the male threaded element comprising a male threading and a male lip between a free end and said male threading, said male lip comprising an external peripheral surface terminating transversely with respect to an axis of the threaded tubular connection by a male end surface that is annular in shape;
the female threaded element comprising a female threading corresponding to the male threading and a non-threaded female housing portion for housing the male lip, said female housing portion comprising an internal peripheral surface and a female shoulder surface, which is annular and with a partially transverse orientation, the male threading being made up into the female threading to a position in which the male annular end surface is engaged against the female shoulder surface,
wherein, in a first state prior to an expansion, the annular surfaces of the male end surface and the female shoulder have complementary shapes for embedding the male end surface with the female shoulder surface, and wherein the external peripheral surface of the male lip is disposed with a small clearance from the internal peripheral surface of the female housing, and
wherein, in a second state after said expansion, said external peripheral surface of said male lip and said internal peripheral surface of said female housing form sealing surfaces.

2. A threaded tubular connection according to claim 1, wherein the male end surface has a shape of a rabbet constituted by a transverse surface on an internal side of the threaded tubular connection and on a side opposite the rabbet by an axially projecting annular tongue, and wherein the female shoulder surface has a shape of a rabbet constituted by a transverse surface on a side directed towards an interior of the threaded tubular connection and by an annular groove on an opposite side, the transverse surface of rho male rabbet co-operating with the transverse surface of the female rabbet and the tongue cooperating with the groove.

3. A threaded tubular connection according to claim 2, wherein annular walls of the tongue and the groove are disposed such that in a connected position of the threaded connection, the annular wails of the groove radially interference fit with the annular walls of the tongue.

4. A threaded tubular connection according to claim 3, wherein the annular walls of die tongue are slightly tapered and converge towards a free end of the tongue, and wherein the annular wails of the groove are slightly tapered and converge towards abase of the groove, an inclination of the walls of the groove being equal to an inclination of the walls of the tongue.

5. A threaded tubular connection according to claim 2, wherein the transverse surfaces of the male and female rabbet abut against each other.

6. A threaded tubular connection according to claim 2, wherein a radial thickness of the tongue is substantially equal to a radial thickness of the transverse surface of the male lip.

7. A threaded tubular connection according to claim 2, wherein an axially measured length of the tongue is substantially equal to its radial thickness.

8. A threaded tubular connection according to claim 2, wherein the external peripheral surface of the male lip and internal peripheral surface of the female housing are cylindrical.

9. A threaded tubular connection according to claim 1, wherein the male lip has a thickness in a range of 1/3 to 2/3 of a thickness of the first pipe.

10. A threaded tubular connection according to claim 1, wherein the male lip has a length and thickness such that a ratio of the length of the male lip to its thickness is in a range of 1 to 4.

11. A threaded tubular connection, comprising:
a male threaded element at one end of a first pipe; and
a female threaded element at one end of a second pipe;
the male threaded element comprising a male threading and a male lip between a free end and said male threading, said male lip comprising an external peripheral surface terminating transversely with respect to an axis of the threaded tubular connection by a male end surface that is annular in shape;
the female threaded element comprising a female threading corresponding to the male threading and a non-threaded female housing portion for housing the male lip, said female housing portion comprising an internal peripheral surface and a female shoulder surface, which is annular and with a partially transverse orientation, the male threading being made up into the female threading to a position in which the male annular end surface is engaged against the female shoulder surface,
wherein, in a state prior to an expansion, the annular surfaces of the male cud surface and the female shoulder have complementary shapes for embedding the male end surface with the female shoulder surface, ad wherein the external peripheral surface of the male lip is disposed with a small clearance from the internal peripheral surface of the female housing, and
wherein the male threaded element has a groove at an end of the male threading between the male threading and the male lip.

12. A threaded tubular connection according to claim 11, wherein the groove has a depth equal to a height of the male threading.

13. A threaded tubular connection according claim 11, wherein the groove has a length and a depth such that the male lip length is in a range of 2 to 8 times its depth.

14. A threaded tubular connection according to claim 1, wherein the first pipe and the second pipe have a same internal diameter both at the threaded elements and in a pipe body.

15. A threaded tubular connection according to claim 14, wherein the first pipe and the second pipe have a same external diameter, both at the threaded elements and in the pipe body.

16. A Threaded tubular connection according to claim 14, wherein the threaded tubular connection is integral.

17. A sealed threaded tubular connection according to claim 2, wherein said tongue does not hear against a base of said groove.

18. A sealed threaded tubular connection according to claim 1, wherein the diametrical expansion by the threaded tubular connection is more than 10%.

19. A process for producing a sealed threaded tubular connection comprising the steps of:
assembling a male threaded element at one end of a first pipe with a female threaded element at one end of a second pipe;
wherein the male threaded element comprises a mile threading and a male lip between a free end and said male threading, said male lip comprising an external peripheral surface terminating transversely with respect an axis of the treaded tubular connection by a male end surface that is annular in Shape;
wherein the female threaded element comprises a female threading corresponding to the male threading and a non-threaded female housing portion for housing the male lip, said female housing portion comprising an internal peripheral surface and a female shoulder surface, which is annular and with a partially transverse orientation, the male threading being made up jaw the female threading to a position in which the male annular end surface is engaged against the female shoulder surface,
wherein, in a first state prior to an expansion, the annular surfaces of the male end surface and the female shoulder have complementary shapes for embedding the male end surface with the female shoulder surface, and wherein the external peripheral surface of the male lip is disposed with a small clearance, from the internal peripheral surface of the female housing, and wherein, in a second state after said expansion, said external peripheral surface of said mate lip and said internal peripheral surface of said female housing form sealing surfaces, and
diametrically expanding said male and female treaded elements from said first state to said second state with an expansion mandrel having a diameter greater than an internal diameter of the first and second pipes, said mandrel being axially displaced inside said male and female threaded elements, dimensions of the male lip and the female housing being such that during passage of the mandrel, the male lip and the female housing initially together undergo plastic bending deformation while only the female housing then undergoes plastic deformation in a reverse, straightening direction, which interference fits the male lip with the female housing.

20. A process for producing a sealed treaded tubular connection according to claim 19, wherein bending of the male lip is delimited by a presence of a groove at an end of the male lip on a side of the male treading.

21. A process for producing a sealed threaded tubular connection according to claim 19, wherein the expansion mandrel is displaced from the male threaded element towards the female threaded element.

22. A process according to claim 19, wherein the male end surface has a shape of a rabbet constituted by a transverse surface on an internal side of the threaded tubular connection and on a side opposite the rabbet by an axially projecting annular tongue, and wherein the female shoulder surface has a shape of a rabbet constituted by a transverse surface on a side directed towards an interior of the threaded tubular connection and by an annular groove on an opposite side, wherein the step of assembling comprises introducing the tongue in the groove.

23. A process according to claim 22, wherein the step of assembling comprises positioning the annular walls of the tongue and groove such that the annular walls of the groove radially interference fit with the annular walls of the tongue.

24. A process according to claim 22, wherein the annular walls of the tongue are slightly tapered and converge towards a free end of the tongue, and wherein the annular walls of the groove are slightly tapered and converge towards abase of the groove, an inclination of the walls of the groove being equal to an inclination of the walls of the tongue, and wherein the step of assembling comprises positioning the annular walls of the tongue and groove against each other.

25. A process according to claim 22, wherein the step of assembling comprises abutting the transverse surface of the male rabbet against the transverse surface of the female rabbet.

26. A threaded tubular connection comprising:
a male threaded element at one end of a first pipe; and
a female threaded element at one end of a second pipe;
the male threaded element comprising a male threading and a male lip positioned next to said male threading, said male threaded element terminating in an annular tongue, wherein said male lip extends over an entire length between said annular tongue and said male threading, said male lip having an external peripheral surface;
the female threaded element comprising a female threading corresponding to the male threading and a non-threaded female housing portion for housing the male lip, said female housing portion comprising an internal peripheral surface,
wherein, in a state prior to an expansion, the male threading is screwed into said female threading and the external peripheral surface of the male lip is disposed with a small clearance from the internal peripheral surface of the female housing so that said entire length of said male lip between said annular tongue and said male threading is contact free.

27. A threaded tubular connection according to claim 26, wherein said external peripheral surface of the male lip and said internal peripheral surface of the female housing are cylindrical.

28. A threaded tubular connection according to claim 26, wherein said female threaded element comprises a groove and said tongue projects axially into said groove.

29. A threaded tubular connection according to claim 28, wherein annular walls of said tongue are tapered and converge toward a free end of the tongue, and wherein the annular walls of said groove are tapered and converge towards a base of the groove.

30. A threaded tubular connection according to claim 26, wherein said male threading element comprises a transverse annular end surface, and wherein said female threaded element comprises a transverse annular shoulder surface, the male threading being into the female threading so that the male transverse annular end surface is engaged against the female transverse annular shoulder surface.

31. A threaded tubular connection comprising:
a male threaded element at one end of a first pipe; and
a female threaded element at one end of a second pipe;
the male threaded element comprising a male threading and a male lip positioned next to said male threading, said male threaded element terminating in an annular tongue, wherein said male lip is positioned between said annular tongue and said male threading, said male lip having an external peripheral surface;
the female threaded element comprising a female threading corresponding to the male threading and a non-threaded female housing portion for housing the male lip, said female housing portion comprising an internal peripheral surface,
wherein said external peripheral surface of the male lip and said internal peripheral surface of the female housing are cylindrical, and
wherein, in a state prior to an expansion, the male threading is screwed into said female threading and the external peripheral surface of the male lip is disposed with a small clearance from the internal peripheral surface of the female housing so that said male lip between said annular tongue and said male threading is free of contact with said internal peripheral surface of the female housing.

32. A threaded tubular connection according to claim 31, wherein said tongue has tapered annular walls which project axially from said male lip.

33. A threaded tubular connection according to claim 32, wherein said female threaded element comprises a groove and said tongue projects axially into said groove.

34. A threaded tubular connection according to claim 33, wherein said annular walls of said tongue converge toward a free end of the tongue, and wherein annular walls of said groove are tapered and converge towards a base of the groove.

35. A threaded tubular connection according to claim 31, wherein said male threading element comprises a transverse annular end surface, and wherein said female threaded element comprises a transverse annular shoulder surface, the male threading being into the female threading so that the male transverse annular end surface is engaged against the female transverse annular shoulder surface.

* * * * *

UNITED STATES PATENT AND TRADEMARK OFFICE
CERTIFICATE OF CORRECTION

PATENT NO. : 6,712,401 B2
DATED : March 30, 2004
INVENTOR(S) : Jean-Luc Coulon et al.

It is certified that error appears in the above-identified patent and that said Letters Patent is hereby corrected as shown below:

Column 7,
Line 14, replace "et" with -- $e_t$ --.

Column 10,
Line 28, begin a new paragraph starting with "FIG. 7 shows…".

Column 11,
Line 22, replace "$e_t$" with -- $e_l$ --.
Lines 42 and 43, replace "AR" with -- $A_R$ --.

Column 12,
Line 12, replace "12-157.5" with -- 12 = 157.5 --.

Column 13,
Line 2, replace "rho" with -- the --.
Lines 8 and 13, replace "wails" with -- walls --.
Line 11, replace "die" with -- the --.
Line 56, replace "cud" with -- end --.
Line 58, replace "ad" with -- and --.

Column 14,
Line 12, replace "Threaded" with -- threaded --.
Line 25, replace "mile" with -- male --.
Line 29, replace "an axis" with -- to an axis --.
Line 30, replace "Shape" with -- shape --.
Line 37, replace "jaw" with -- into --.
Lines 52 and 64, replace "treaded" with -- threaded --.
Line 67, replace "treading" with -- threading --.

UNITED STATES PATENT AND TRADEMARK OFFICE
CERTIFICATE OF CORRECTION

PATENT NO. : 6,712,401 B2
DATED : March 30, 2004
INVENTOR(S) : Jean-Luc Coulon et al.

It is certified that error appears in the above-identified patent and that said Letters Patent is hereby corrected as shown below:

Column 15,
Line 23, replace "abase" with -- a base --.

Signed and Sealed this

Tenth Day of August, 2004

JON W. DUDAS
*Acting Director of the United States Patent and Trademark Office*